United States Patent
Pollmann (10) Patent No.: US 9,836,033 B2
(45) Date of Patent: Dec. 5, 2017

(54) METHOD FOR CONTROLLING A SYSTEM

(71) Applicant: PHOENIX CONTACT GMBH & CO. KG, Blomberg (DE)

(72) Inventor: Werner Pollmann, Hoexter (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 600 days.

(21) Appl. No.: 14/378,339

(22) PCT Filed: Feb. 18, 2013

(86) PCT No.: PCT/EP2013/000476
§ 371 (c)(1),
(2) Date: Aug. 13, 2014

(87) PCT Pub. No.: WO2013/124050
PCT Pub. Date: Aug. 29, 2013

(65) Prior Publication Data
US 2015/0039131 A1    Feb. 5, 2015

(30) Foreign Application Priority Data

Feb. 21, 2012 (DE) .................. 10 2012 003 272
Jun. 13, 2012 (DE) .................. 10 2012 011 600

(51) Int. Cl.
G05B 15/02 (2006.01)
G05B 19/042 (2006.01)
G05B 9/03 (2006.01)

(52) U.S. Cl.
CPC ............ *G05B 15/02* (2013.01); *G05B 9/03* (2013.01); *G05B 19/0428* (2013.01); *G05B 2219/24178* (2013.01)

(58) Field of Classification Search
None
See application file for complete search history.

(56) References Cited

U.S. PATENT DOCUMENTS

| | | |
|---|---|---|
| 2003/0140270 A1 | 7/2003 | Lehmann |
| 2004/0059503 A1* | 3/2004 | Peters ............... G08G 1/04 701/300 |
| 2006/0088044 A1* | 4/2006 | Hammerl ........... G06F 12/0661 370/402 |
| 2006/0288142 A1 | 12/2006 | Beyer et al. |

(Continued)

FOREIGN PATENT DOCUMENTS

| | | |
|---|---|---|
| CN | 101044438 A | 9/2007 |
| CN | 101523310 A | 9/2009 |

(Continued)

*Primary Examiner* — Tuan Dao
(74) *Attorney, Agent, or Firm* — Leydig, Voit & Mayer, Ltd.

(57) ABSTRACT

A method for controlling a system consisting of at least two control units, namely a first control unit and a second control unit. The system includes least one actuator and at least one sensor. The control units generate control data for the actuator on the basis of the information from the sensor. The method includes receiving, with the actuator, both the control data of the first control unit and the control data of the second control unit. The method also includes deciding, with the actuator, whether to use the control data of the first or second control unit to carry out an actuator function with the actuator.

10 Claims, 5 Drawing Sheets

(56) References Cited

U.S. PATENT DOCUMENTS

| | | | |
|---|---|---|---|
| 2007/0164168 A1* | 7/2007 | Hirvonen | B64C 13/04 244/223 |
| 2007/0200716 A1* | 8/2007 | Haase | G08B 15/004 340/574 |
| 2007/0294361 A1 | 12/2007 | Arzig | |
| 2010/0030937 A1 | 2/2010 | Schuermann et al. | |
| 2010/0231351 A1* | 9/2010 | Lickfelt | B60R 25/04 340/5.6 |
| 2010/0309004 A1 | 12/2010 | Grundler et al. | |
| 2012/0125950 A1* | 5/2012 | Bouix | A45D 34/00 222/146.5 |
| 2012/0330452 A1* | 12/2012 | Guenther | G05B 19/41875 700/110 |
| 2013/0127980 A1* | 5/2013 | Haddick | G06F 3/013 348/14.08 |

FOREIGN PATENT DOCUMENTS

| | | |
|---|---|---|
| CN | 101925934 A | 12/2010 |
| DE | 19644126 A1 | 4/1998 |
| DE | 19929645 A1 | 1/2001 |
| DE | 10030329 C1 | 1/2002 |
| DE | 102005027666 B3 | 12/2006 |
| DE | 102007061754 A1 | 6/2009 |
| DE | 102006047026 B4 | 2/2011 |
| KR | 20100115959 A | 10/2010 |
| WO | WO 9108535 A1 | 6/1991 |
| WO | WO 2006042779 A1 | 4/2006 |

* cited by examiner

METHOD FOR CONTROLLING A SYSTEM

CROSS-REFERENCE TO RELATED APPLICATIONS

This application is a U.S. National Phase application under 35 U.S.C. §371 of International Application No. PCT/EP2013/000476, filed on Feb. 18, 2013, and claims benefit to German Patent Application No. DE 10 2012 003 272.2, filed on Feb. 21, 2012 and German Patent Application No. DE 10 2012 011 600.4, filed on Jun. 13, 2012. The International Application was published in German on Aug. 29, 2013, as WO 2013/124050 A1 under PCT Article 21 (2).

FIELD

The invention relates to a method for controlling a system which consists of at least two control units, namely a first control unit and a second control unit, at least one actuator and at least one sensor. The control units generate control data for the at least one actuator on the basis of the information from the at least one sensor.

BACKGROUND

In many systems in which high availability and system stability is required, for example in automation systems in manufacturing engineering (for example in the pharmaceutical industry, the chemical industry, the motor industry or the utility industry) or in automated tunnel lighting systems, the automation technology is designed to be redundant. If a part of the automation technology fails, a part having the same function, two of said part being provided, can take over the faulty function, whereby the proper functioning of the system is ensured.

Figure 1:
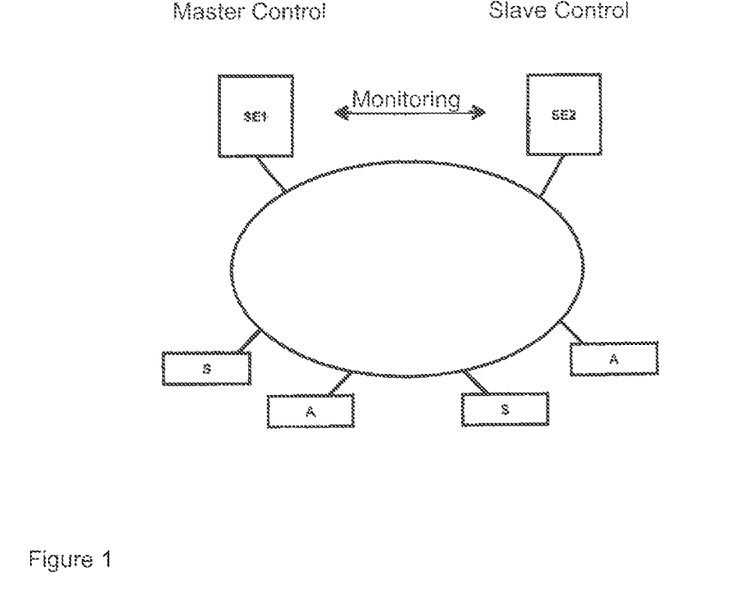
FIG. 1 shows a redundant system comprising a master controller and a slave controller according to the prior art.

Such a system is generally constructed as follows (see FIG. 1):

A redundant, communication network with high availability is connected to a central control unit, which network in turn constitutes the connection to the input and output units (sensors/actuators) of the system. Typically, everything from the controller to the communication plane is designed to be redundant, whereas the sensor/actuator plane is often designed to not be redundant. The redundancy in terms of the control is achieved by a first control unit taking over the control of the system as a master controller, while a second control unit waits for a failure of the master controller as a slave controller. For this purpose, constant alignment takes place between the two control units via a communication connection. The controller (master/slave) then communicates with the sensor/actuator plane via a communication path. The sensors provide the data to either the master or the two controllers. The actuators are operated by the master controller and provided with data. In the master controller fails, the slave controller takes over the communication with the sensors and actuators, the sensor/actuator plane not noticing this at all. The actuators do not influence the origin of the control data.

DE 10 2005 027 666 B3 and WO 91/08535 A1 disclose system control methods using master and slave controllers that communicate with one another.

DE 199 29 645 A1, DE 10 2007 061 754 A1 and DE 196 44 126 A1 disclose systems for actuating an escape route illumination means.

In this context, establishing communication between the master controller and the slave controller so as to achieve redundancy on the control plane is in some cases associated with particularly high complexity and costs.

SUMMARY

In an embodiment, the present invention provides a method for controlling a system including a first control unit and a second control unit. The system includes an actuator and a sensor. The control units generate control data for the actuator on the basis of the information from the sensor. The method includes receiving, by the actuator, both the control data of the first control unit and the control data of the second control unit. The method also includes deciding, by the actuator, whether to use the control data of the first or second control unit to carry out an actuator function with the actuator.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In one aspect, the invention provides a method for controlling a generic system, which method offers high degrees of availability and system stability in a simple and reliable manner.

The method according to the invention is characterised in that the at least one actuator receives both the control data of the first control unit and the control data of the second control unit. In this case, the actuator is designed according to the invention such that said actuator decides itself (autonomously) whether to use the control data of the first or second control unit to carry out its actuator function.

The basic concept therefore consists in the actuators being the managers for the redundant system and the higher-lever control units working as mere data suppliers. For this purpose, the actuators are constantly provided with control data by the two higher-level control units. Communication thus takes place between the actuator and the two control units. Communication between the two control units is not required. Accordingly, there is no need for a complex and expensive cable or radio communication connection between the two control units. This is particularly advantageous when the two control units are very spatially remote from one another. The two control units are equivalent.

Another advantage is that the switching times are reduced, since an actuator notices as early as within a communication cycle in a communication network whether or not a control unit is present. Corresponding alignment between a master controller and a slave controller typically takes considerably longer. The control units do not have to align themselves with one another, as a result of which the control software is much simpler.

In addition, it is possible to activate or deactivate actuators in a simple manner, e.g. for energy management or servicing, without the control units having to be aware of this.

The control units do not require any information relating to the location at which the system has been interrupted, nor do they need to be set up for this using software.

Another advantage resides in the communication network. The communication network can be constructed in various ways without impairing the quality of the redundancy behaviour. This is a significant advantage with spatially separate control units in particular.

In a first embodiment, the actuator comprises a selection means by means of which the actuator automatically selects whether the control data of the first or second control unit are used to carry out the actuator function. A selection switch which can be actuated manually, for example a DIP switch, can be used as the selection means on the actuator.

In a second embodiment, a selection criterion in the control program of the control electronics is used as the selection means.

If the first control unit fails and no more control data are received therefrom, the actuator automatically selects the control data of the second control unit for carrying out the actuator function, and vice versa.

In an advantageous embodiment, the at least one actuator transmits a synchronisation signal to the two control units, whereupon the two control units retrieve the information from the at least one sensor and transmit corresponding control data to the actuator on the basis of the updated sensor information. This ensures that the two control units each use the most recent sensor data for actuating the actuator.

A communication network, preferably a bus system, is used for the data exchange between the two control units and the at least one actuator.

In this case, data is exchanged between the two control units and the at least one respective sensor via the same communication network by means of which the communication with the at least one actuator also takes place.

The invention shall be described in more detail below with reference to the accompanying drawings.

Figure 2:
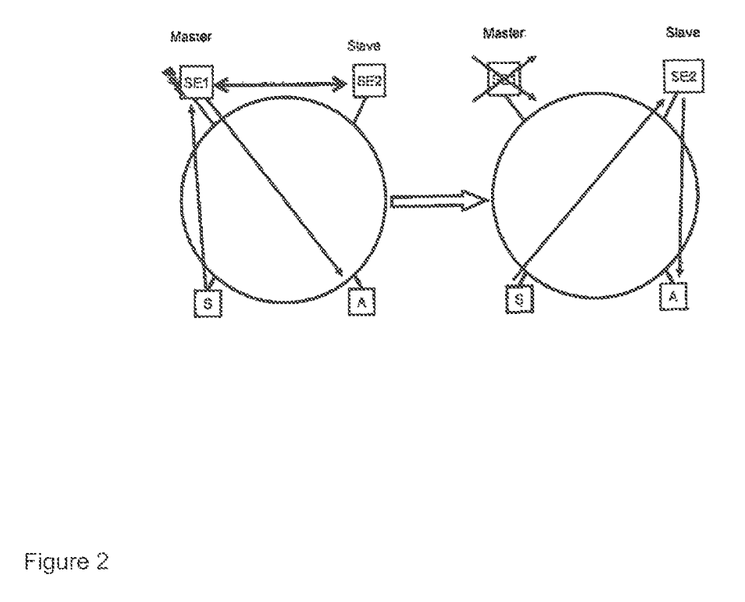
FIG. 2 shows the switching from the master controller to the slave controller in the event of a failure of the master controller.

FIG. 1 shows a system according to the prior art comprising two control units (SE1, SE2), in which the first control unit (SE1) is designed as the master controller and the second control unit (SE2) is designed as the slave controller. The two sensor units (SE1, SE2) are connected to sensors (S) and actuators (A) via a ring communication network. In this case, the master controller generates the control data for the actuators (A) on the basis of the information from the sensors (S). The master controller and slave controller monitor one another so that the system control is taken over by the slave controller in the event of a failure of the master controller (see FIG. 2).

According to the invention, two equivalent control units (SE1) and (SE2) are provided which do not need to communicate with one another. In this case, the at least one actuator (A) or the actuators (A) receive both the control data of the first control unit (SE1) and the control data of the second control unit (SE2). The system availability when one control unit fails is achieved according to the invention by the use of intelligent actuators (A), each actuator (A) being designed such that it decides itself whether to use the control data of the first or the second control unit (SE1, SE2) to carry out its actuator function.

The communication network can be constructed in various ways without impairing the quality of the redundancy behaviour. This is a significant advantage with spatially separate control units (SE1, SE2) in particular.

Various possible design variants for a communication network according to the invention are shown in FIG. 3A-3D. For the sake of simplicity, the figures show a system having just two actuators (A1, A2). Each of the two control units (SE1, SE2) is connected to every actuator (A1, A2) via a communication channel. According to FIG. 3A, the actuator (A1) has by default selected the control unit (SE1) as the control data supplier in order to carry out its actuator function, whereas the actuator (A2) has by default selected the control unit (SE2) as the control data supplier in order to carry out its actuator function. According to FIG. 3B, the actuator (A1) has by default selected the control unit (SE2) as the control data supplier in order to carry out its actuator function, whereas the actuator (A2) has by default selected the control unit (SE1) as the control data supplier in order to carry out its actuator function. According to FIG. 3C, both actuators (A1, A2) have by default selected the control unit (SE2) as the control data supplier in order to carry out their respective actuator functions; according to FIG. 3D, both actuators (A1, A2) have by default selected the control unit (SE1).

In the event of a failure of one control unit (SE1, SE2), the actuators (A1, A2) automatically switch to the other control unit, respectively.

If the first control unit (SE1) fails and no more control data are received therefrom, the actuators (A1, A2) automatically select the control data of the second control unit (SE2) to carry out their respective actuator function, and vice versa.

Figure 3A:
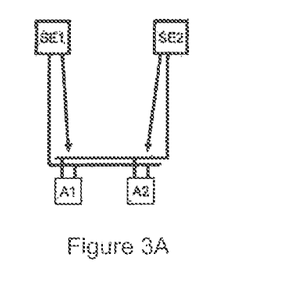
FIG. 3A-3E show different design variants of the communication network.
Figure 3B:
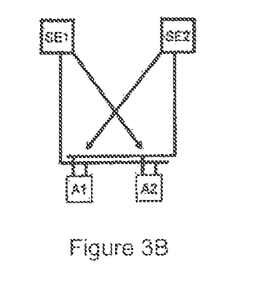
Figure 3C:
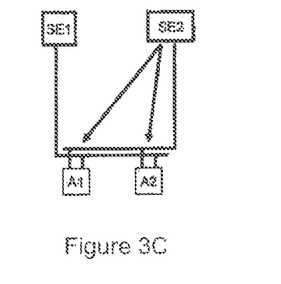
Figure 3D:
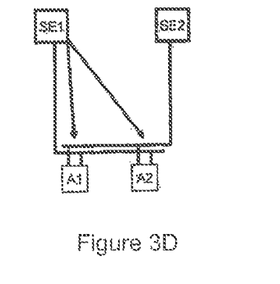
Figure 3E:
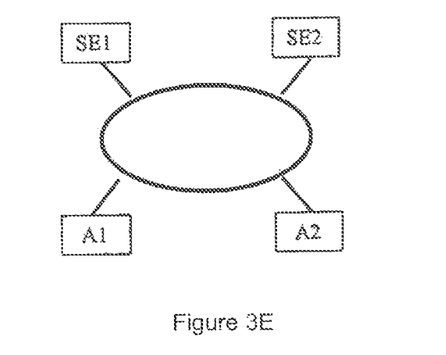

FIG. 3E shows a communication network constructed as a ring network.

The actuator (A) according to the invention can for example be an illumination means, which can be switched on and off, a servomotor or a valve.

The sensor (S) according to the invention can be for example a photoelectric sensor, a potentiometer, an ultrasound sensor, a fill level indicator or a smoke alarm.

Figure 4:
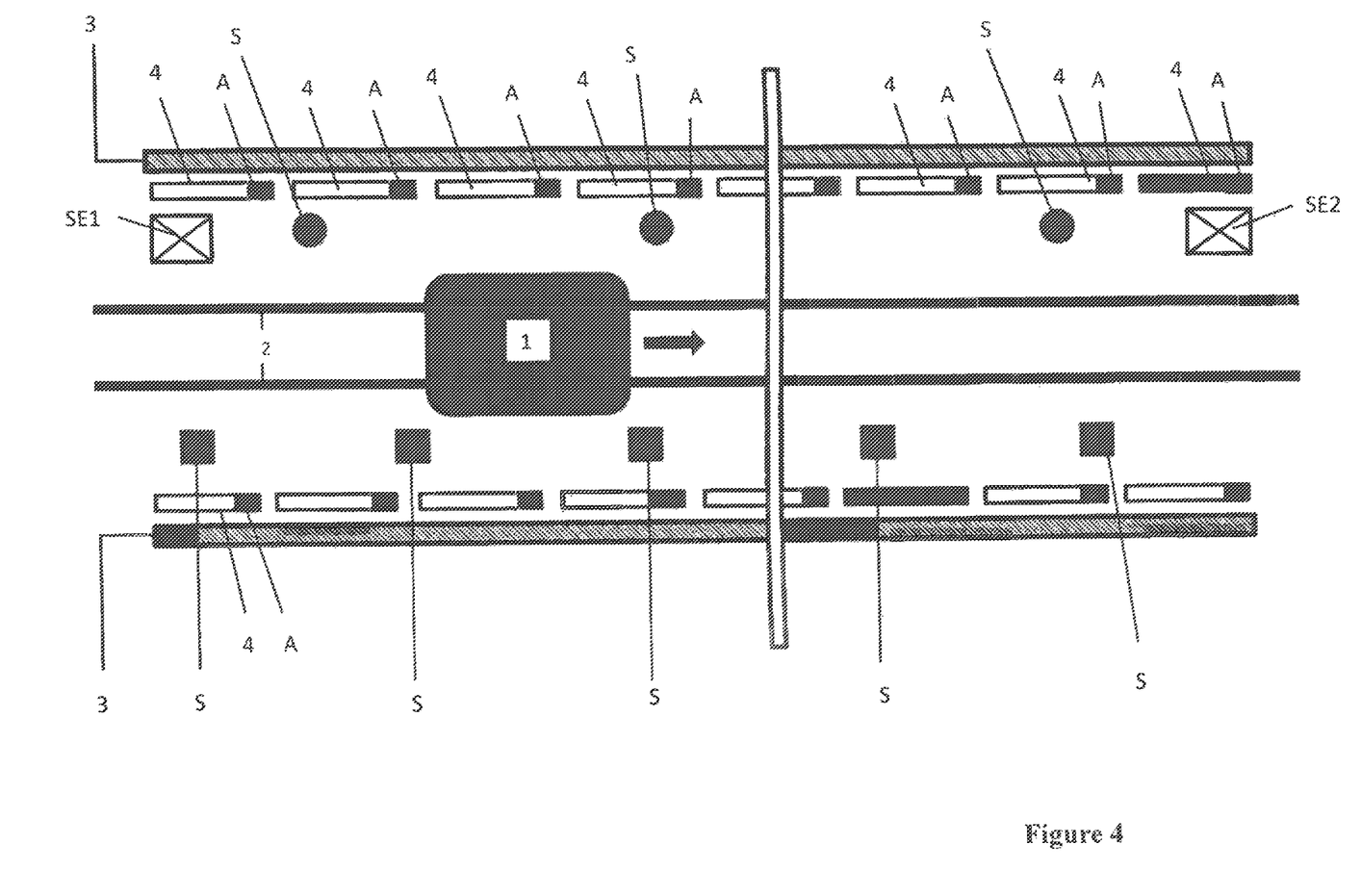
FIG. 4 shows a system for controlling an escape route illumination means and/or emergency lighting in a vehicle tunnel.

FIG. 4 is a schematic view of a system for controlling an escape route illumination means (4) and/or emergency lighting in a tunnel used by vehicles. The side limits of the tunnel are indicated by the tunnel walls (3). There are rails (2) inside the tunnel, on which rail-bound vehicles/trains (1) pass through the tunnel A plurality of sensors (S) are now arranged at particular intervals in the longitudinal direction of the tunnel. These sensors (S) are designed to detect the position and/or the movement of vehicles (1) or to detect smoke and/or fire. The number of and distance between the sensors is determined by the tunnel length and the length of the vehicles (1) travelling through the tunnel. The first type of sensor (S), which is designed to detect the position and/or the movement of vehicles (1), is denoted by a square symbol in FIG. 4. The second type of sensor (S), which is designed to detect smoke and/or fire, is denoted by a circular symbol in FIG. 4. For the specific technical configuration of these sensors (S), a person skilled in the art can draw on the routine position, movement, smoke or fire sensors. Each of these sensors is connected to two control units (SE1, SE2) and transmits its sensor information thereto. For safety reasons, the two control units (SE1, SE2) are spaced apart from one another as much as possible within the tunnel, so that both control units are not damaged for example in the event of a fire or from mechanical influences. In this context, the first control unit (SE1) is preferably arranged in the region of the tunnel entrance and the second control unit (SE2) is arranged in the region of the tunnel exit.

A broken down vehicle (1) within a tunnel constitutes an emergency situation. If a vehicle (1) breaks down in the tunnel, i.e. is no longer moving, this is detected by the sensors (S). On the basis of the sensor information, the control units (SE1, SE2) can determine whether a vehicle has broken down in the tunnel. In a preferred embodiment, on the basis of the sensor information the control units (SE1, SE2) can also establish on which track portion the vehicle (1) has broken down. In such an emergency situation, the highest priority is to safely evacuate the occupants of the vehicle from the tunnel. In order to allow the occupants of the vehicle to leave the tunnel, and to make this easier, an escape route illumination means (4) and/or emergency lighting is provided within the tunnel which is switched on by the control units (SE1, SE2) if an emergency situation is detected, as described above. In the most simple case, just one escape route illumination means (4) or emergency lighting means is provided in the tunnel, said lighting being switched on and off by an actuator (A) formed as a switch. This actuator (A) is now in turn connected to the two control units (SE1, SE2) and receives the control data of both control units (SE1, SE2) in order to carry out its actuator function (switching the escape route illumination means or emergency lighting on and off). In this case, the actuator (A) is designed according to the invention such that it decides itself whether to use the control data of the first or second control unit to carry out its actuator function. This creates a redundancy with regard to the receipt of the control data, without the need for the two control units (SE1, SE2) to be interconnected via cables or radio. Given that it is very complex and cost-intensive to connect the two control units (SE1, SE2) in a tunnel, which control units are spatially very remote from one another, the method according to the invention with the specific configuration of the actuators (A) is particularly advantageous for this application.

As shown in FIG. 4, the escape route illumination means (4) does not consist of a single illumination device, but rather of a plurality of parts arranged on both sides of the tunnel in the tunnel longitudinal direction, each part being designed for example as a luminous band (4). In this case, each luminous band (4) is assigned its own actuator (A). Here, the number of and the distance between the luminous bands (4) are different depending on the tunnel. For their part, the luminous bands preferably in turn consist of a plurality of switchable illumination segments, it being possible to generate a continuous light, dependent on the direction, by selectively switching the individual segments on and off. LEDs are preferably used to illuminate the individual segments. The directionally-dependent continuous light shows the occupants of the vehicle the escape route to the closest tunnel exit or emergency exit. The reference sign 4 is used for both the escape route illumination means as a whole and the parts thereof (when these are provided).

One embodiment provides that each luminous band (4), as a part of the escape route illumination means (4), is assigned its own actuator (A) according to the invention for switching the luminous band on and off, each of these actuators (A) being connected to the two control units (SE1, SE2).

Figure 5:
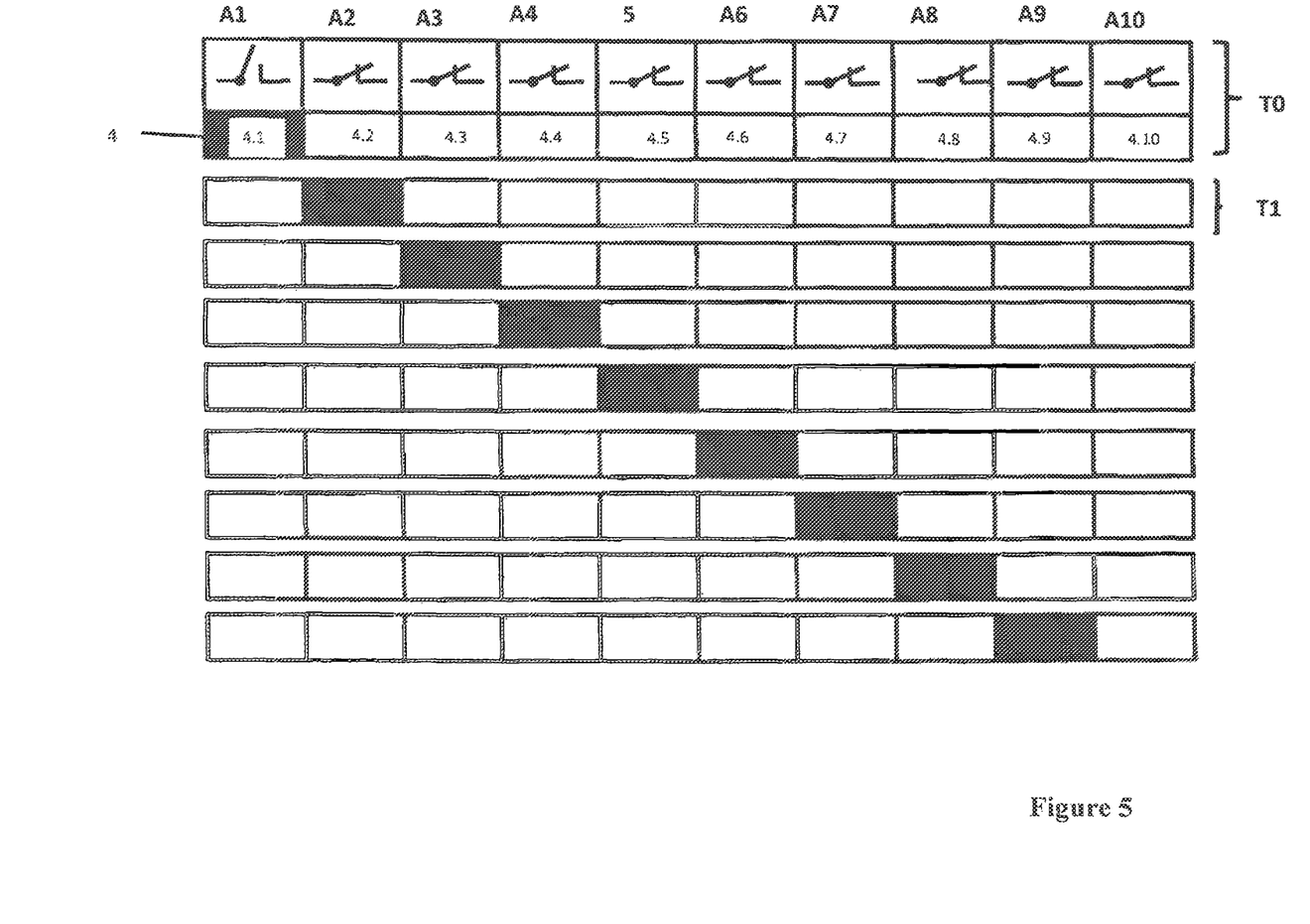
FIG. 5 shows the various actuators formed as switches for switching on and off individual parts of the escape route illumination means.

In a further embodiment, it is provided that each segment of a luminous band is provided with its own actuator according to the invention for switching the respective light segment on and off (see FIG. 5). This figure shows a luminous band consisting of 10 segments (4.1, 4.2, . . . ), each light segment being assigned a separate actuator (A1, A2, . . . ) formed as a switch. Each of these actuators is in turn connected to the two control units (SE1, SE2). In order to generate a continuous light, the individual light segments are switched on and off in succession. This is illustrated schematically in FIG. 5 by means of the time progressions.

Depending on the track portion on which the vehicle has broken down, which is detected by the sensors (S), individual parts (4) of the escape route illumination means are selectively switched on by the actuators (A) in order to indicate to the occupants of the vehicle the closest and safest escape route to a tunnel exit or emergency exit.

In a preferred embodiment, the information from smoke and/or fire sensors (S) is also used for actuating the escape route illumination means (4). This can prevent an escape route to the closest tunnel exit or emergency exit being displayed which would lead through a region affected by smoke and fire.

If actuators (A) use the data of different control units or select another control unit for receiving the control data, it is perceived as disruptive if, in the case of an escape route illumination means (4) that extends over the entire length of the tunnel and consists of a plurality of parts (e g luminous bands), the two control units (SE1, SE2) are not in sync, in particular when generating a continuous light. Against this background, it is particularly advantageous if at least one of the actuators (A) transmits a synchronisation signal to the two control units (SE1, SE2), whereupon the two control units retrieve the information from the sensors and transmit correspondingly synchronised control data to the actuators (A) on the basis of the updated sensor information.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling a system including a first control unit and a second control unit, an actuator, and a sensor, the control units generating control data for the actuator on the basis of the information from the sensor, the method comprising:
- receiving, by the actuator, both the control data of the first control unit and the control data of the second control unit; and
- deciding, by the actuator, whether to use the control data of the first or second control unit to carry out an actuator function with the actuator,
- wherein the actuator transmits a synchronization signal to the two control units such that upon receipt of the synchronization signal, each control unit retrieves information from the sensor and transmits corresponding control data to the actuator on the basis of the information retrieved from the sensor,
- wherein the actuator comprises a selection device via which the actuator automatically selects whether to use the control data of the first or second control unit to carry out the actuator function, and
- wherein the selection device is a selection switch on the actuator that is configured to be actuated manually.

2. The method according to claim 1, wherein the selection switch is a DIP switch.

3. A method for controlling at least one of an escape route illumination device or emergency lighting in a tunnel used by vehicles using a first control unit and a second control unit, an actuator, and a sensor, the control units generating control data for the actuator on the basis of information from the sensor, the method comprising:
- receiving, by the actuator, both the control data of the first control unit and the control data of the second control unit; and
- deciding, by the actuator, whether to use the control data of the first or second control unit to carry out an actuator function with the actuator,
- wherein the actuator is configured to switch at least one of the escape route illumination device or the emergency lighting on and off or parts of the escape route illumination device or parts of the emergency lighting on and off,
- wherein the sensor is configured to detect at least one of a position or a movement of vehicles or at least one of smoke or fire, and
- wherein the actuator transmits a synchronization signal to the two control units such that upon receipt of the synchronization signal, each control unit retrieves information from the sensor and transmits corresponding control data to the actuator on the basis of the information retrieved from the sensor.

4. The method according to claim 3, wherein, when no more control data are received from the first control unit, the actuator automatically selects the control data of the second control unit to carry out the actuator function, and when no more control data are received from the second control unit, the actuator automatically selects the control data of the first control unit to carry out the actuator function.

5. The method according to claim 3, wherein a communication network is used for a data exchange between the two control units and the actuator.

6. The method according to claim 5, wherein the communication network comprises a bus system.

7. The method according to claim 6, wherein data is exchanged between the two control units and the sensor via the bus system.

8. The method according to claim 5, wherein data is exchanged between the two control units and the sensor via the communication network.

9. The method according to claim 3, wherein the first control unit is arranged in a region of an entrance of the tunnel and the second control unit is arranged in a region of an exit of the tunnel.

10. A method for controlling a system including a first control unit and a second control unit, an actuator, and a sensor, the control units generating control data for the actuator on the basis of the information from the sensor, the method comprising:
- receiving, by the actuator, both the control data of the first control unit and the control data of the second control unit; and
- deciding, by the actuator, whether to use the control data of the first or second control unit to carry out an actuator function with the actuator,
- wherein the actuator transmits a synchronization signal to the two control units such that upon receipt of the synchronization signal, each control unit retrieves information from the sensor and transmits corresponding control data to the actuator on the basis of the information retrieved from the sensor,
- wherein the actuator comprises a selection device via which the actuator automatically selects whether to use the control data of the first or second control unit to carry out the actuator function,
- wherein the selection device is a selection switch on the actuator that is configured to be actuated manually, and
- wherein the selection switch is a DIP switch.

* * * * *